United States Patent [19]

Paap et al.

[11] 3,914,603

[45] Oct. 21, 1975

[54] NEUTRON LIFETIME WELL LOGGING METHODS AND APPARATUS

[75] Inventors: Hans J. Paap; Robert W. Pitts, Jr., both of Houston, Tex.

[73] Assignee: Texaco Inc., New York, N.Y.

[22] Filed: Dec. 17, 1973

[21] Appl. No.: 425,367

[52] U.S. Cl. .................. 250/270; 250/269; 250/499
[51] Int. Cl. .............................................. G01v 5/00
[58] Field of Search .......... 250/270, 499, 500, 502, 250/269

[56] References Cited
UNITED STATES PATENTS

| | | | |
|---|---|---|---|
| 3,389,257 | 6/1968 | Caldwell et al. | 250/499 X |
| 3,691,378 | 9/1972 | Hopkinson et al. | 250/270 X |
| 3,751,668 | 8/1973 | Coleman et al. | 250/502 |
| 3,800,150 | 3/1974 | Givens | 250/499 X |

Primary Examiner—Archie R. Borchelt
Attorney, Agent, or Firm—T. H. Whaley; C. G. Ries; William J. Beard

[57] ABSTRACT

A well logging system in which a modulated high energy neutron source is utilized in a well bore to develop an intensity modulated cloud of thermal neutrons as a function of time in the surrounding media. The phase angle of the thermal neutrons is determined relative to the generated high energy neutrons from the neutron source. The formation thermal neutron decay time or neutron lifetime which is a function of type of formation materials, is derived from the phase angle measurement. Electronic systems are provided for computing formation phase angle measurements of thermal neutrons from neutron and gamma ray counts made as a function of time and which are detected by a downhole logging tool. A recording, as a function of depth, is made of the thermal neutron decay time or neutron lifetime values and/or the related thermal neutron macroscopic capture cross-section values.

32 Claims, 7 Drawing Figures

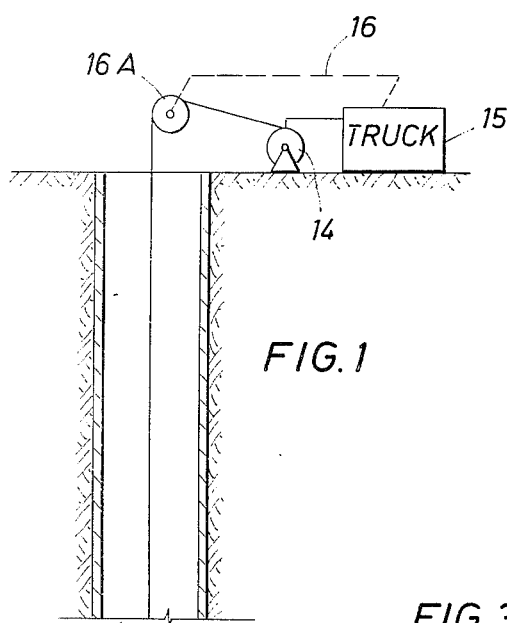
FIG. 1
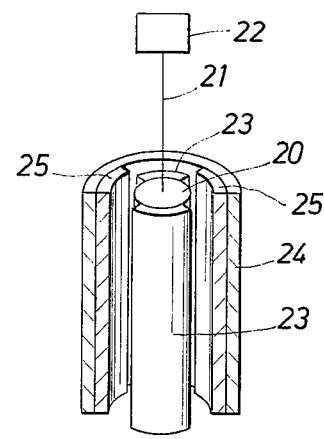
FIG. 2
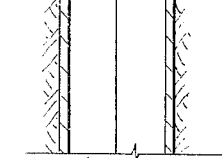
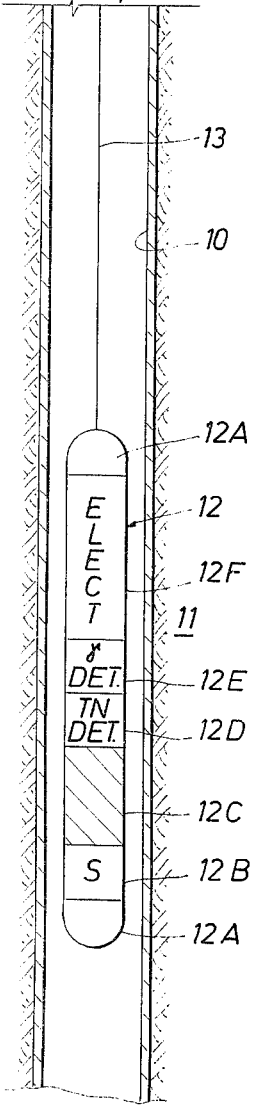
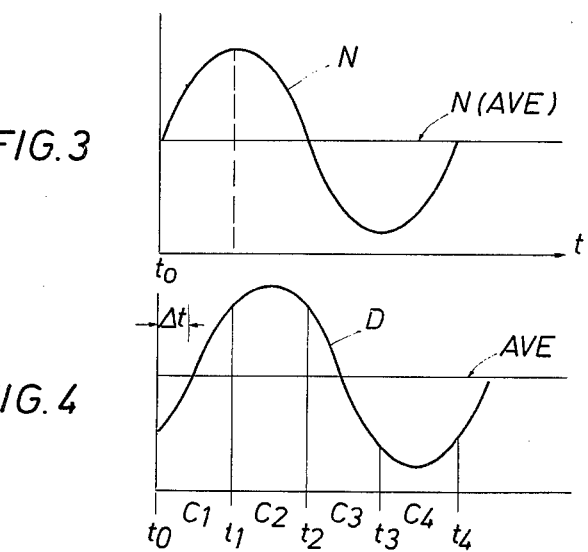
FIG. 3
FIG. 4
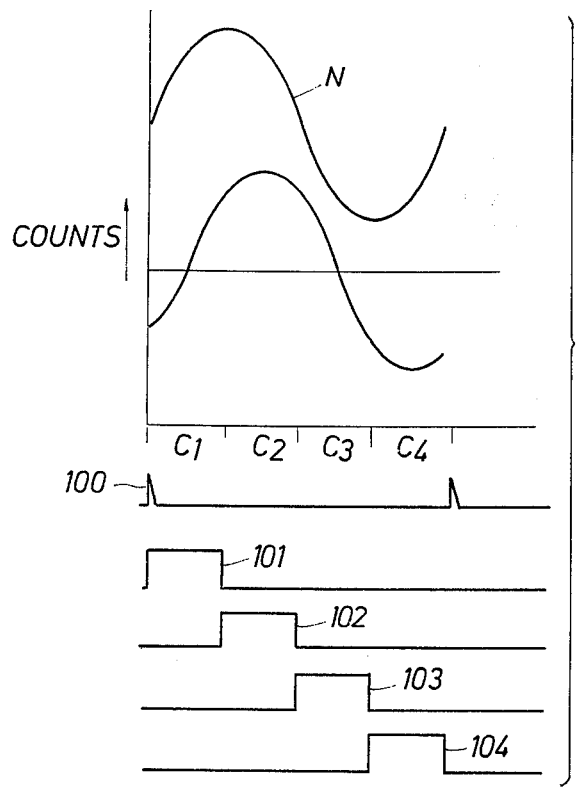
FIG. 7

NEUTRON LIFETIME WELL LOGGING METHODS AND APPARATUS

BACKGROUND OF THE INVENTION

A. Field of the Invention

This invention relates to in situ measurements of earth formations traversed by a well bore. In particular, a cloud of intensity modulated fast neutrons is released into the earth formations in the vicinity of the well bore. The intensity modulated fast neutrons result in a thermal neutron cloud which is produced as the fast neutrons are slowed, and parameters relating to the thermal neutron cloud are measured. In this invention, a well tool includes a deuterium-tritium accelerator type high energy neutron generator whose neutron output is intensity modulated while the tool is in a borehole. Measurements of the thermal neutron characteristics are made and used to define the phase relationship of the thermal neutrons relative to the generated fast neutrons.

B. Description of the Prior Art

At present, there are two principal techniques using neutron or neutron induced gamma ray measurements in a well bore for identifying, in situ, thermal neutron decay time characteristics of the earth formations. These neutron lifetime measurements have proven to be particularly valuable in evaluating earth formations in cased well boreholes. In both techniques, the logging instrument which traverses the well bore uses a pulsed source of high energy or fast (14 MEV) neutrons. In a first technique, the neutron source is repetitively pulsed. For each fast neutron pulse, a cloud of fast neutrons is injected in a generally spherically symmetric fashion about the source to the surrounding earth formations. This fast neutron cloud passes from the well tool through the drilling mud, the well bore casing and the cement between the casing and well bore. Each such fast neutron pulse has approximately constant intensity and exists typically for a time duration of 20 to 30 microseconds which is adequate time to create a thermalized (or low energy) neutron population in the earth formations. The number of thermal neutrons comprising this cloud or population then decays exponentially due to their capture by formation nuclei. After an initial time period (about 300 microseconds), during which resultant gamma ray radioactivity effects in borehole, mud and casing are substantially dissipated, measurements of the number of thermalized neutrons in the vicinity of the well tool during two successive time intervals can be used to define an exponential decay curve for the thermal neutron population of the formation. The two time intervals, for example, can be fixed between 400 to 600 microseconds and between 700 to 900 microseconds. If diffusion effects are ignored, the relationship for decay of a thermal neutron population in a homogeneous medium having a thermal neutron macroscopic capture cross-section $\Sigma$ can be expressed as:

$$N_2 = N_1 e^{-\Sigma r_t} \quad (1)$$

where $N_1$ = the number of thermal neutrons at a first point in time, $T_1$ $N_2$ = the number of thermal neutrons at a later point in time, $T_2$ $e$ = Naperian logarithm base $t$ = time between the two measurements $(t_2 - t_1)$ $v$ = velocity of thermal neutrons.

The macroscopic capture cross-section $\Sigma$ of a reservoir rock (which can be obtained from Equation (1) is dependent upon its porosity, formation water salinity and the quantity and type of petroleum contained in the pore spaces therein, and, thus, is a valuable measurement to obtain.

When neutrons from the high energy source interact with the materials or media in a well bore and with surrounding formations or media, they are slowed down or lose energy. A primary agent for "slowing down" neutrons is hydrogen which is readily available in water and hydrocarbons. After the fast neutrons have been slowed down, they are captured by formation nuclei (primarily by chlorine) and generate characteristic capture gamma rays before returning to a stable state. It is the "capture" gamma rays which are detected during the two different time intervals. The number of such gamma rays detected is proportional to the thermal neutron population around the tool. Alternatively, thermal neutrons themselves can be detected during these intervals by the use of $He^3$ or other neutron detectors, if desired. By the fixed time gate measurements, the capture cross-section $\Sigma$ can be thus determined.

A second technique for measuring thermal neutron decay times or neutron lifetimes uses the reciprocal of the macroscopic capture cross-section $\Sigma$ as defined in terms of $\tau$ (the time constant for absorption of the thermal neutrons). A relationship is thus defined in terms of $\tau$ $$N = N_o e^{-\frac{T}{\tau}} \quad \text{WHERE} \quad \tau = \frac{1}{v\Sigma} \quad (2)$$

where $N$ = thermal neutron density at any time, $t$ $N_o$ = thermal neutron density at an initial time $t_o$ $e$ = Naperian logarithm constant $\tau$ = time required for thermal neutron population to decay to $1/e$ of its value at $t_o$.

Logging equipment using this second technique obtains the counts of capture gamma rays during two successive time intervals to define the decay curve where the two time intervals of the measurement are defined as a function of the $\tau$ value actually measured, using the value of $\tau$ to establish the neutron burst width, the waiting intervals to the measurement and the measuring intervals.

Both the foregoing systems determine decay times of thermal neutrons as a function of time following a neutron burst of substantially constant intensity. In the present invention, by way of contrast, the measurements are based upon high energy neutrons generated by an intensity modulated source and are related relative to the phase of the resultant thermal neutron population as defined by the thermal neutron capture gamma rays.

BRIEF DESCRIPTION OF THE INVENTION

In the present invention, a well logging tool includes an intensity modulated fast neutron source, a thermal neutron detector and a gamma ray detector. The neutron source generates a generally harmonically varying population of fast neutrons as a function of time which are introduced into the surrounding media. The thermal neutron population resulting from the slowing down of the fast neutrons in the surrounding media and which itself comprises a phase coherent neutron cloud is detected by the gamma ray detector (which is spaced for this purpose). The relative phase angle of this thermal neutron cloud (which is intensity modulated) to the fast neutron cloud produced by the neutron source is measured. The neutron detector is spaced so as to detect primarily the thermal neutron population attributable to the borehole. Again the phase of this thermal neutron population relative to the phase of the intensity modulated neutron source is measured. The composite phase angle measured at the gamma ray detector (which may be thought of as the combination of a formation component and a borehole component) relative to the neutron source is determined from the response of the gamma ray detector. The phase angle of the borehole component relative to the neutron source is computed from the response of the thermal neutron detector. When the phase angle for the borehole component is subtracted from the phase angle of the composite borehole and formation component, the resulting phase angle is that of the formation component alone. The phase angles are determined by combining counts from the two aforementioned detectors in a particular manner to derive tangent values for the phase angle. From the tangent value for the phase angle, the formation thermal neutron decay time $\tau$ or the corresponding macroscopic capture cross-section value $\Sigma$ can be established.

The system for determining formation thermal neutron decay time or capture cross-section values includes a downhole tool for providing positive, sharp peaked, electrical pulse signals representative of radioactivity counts from a gamma ray detector, a positive, large, sharp peaked sync (or synchronization) pulse for each cycle of fast neutron intensity alternation and negative, sharp peaked, electrical pulse signals representative of thermal neutrons as detected by a thermal neutron detector. At the earth's surface, the system includes a recorder for providing a record of the measurements as a function of depth in the borehole. The downhole measurements are separated so that the gamma ray count signals are supplied to one computation circuit and the thermal neutron count signals are supplied to a second computation circuit. The first computation circuit determines the tangent of the aforementioned composite phase angle while the second computation circuit determines the tangent of the phase angle attributable to the borehole component. The corrected tangent for the formation component is determined by subtraction of the borehole component phase angle tangent value from the composite phase angle tangent value. From the formation component value, the thermal neutron capture cross-section or decay time values are determined and recorded.

BRIEF DESCRIPTION OF THE DRAWINGS

FIG. 1 is a schematic view in cross-section of a logging system in accordance with the concepts of the invention in a well bore which traverses earth formations;

FIG. 2 is a perspective view of a neutron source capable of generating intensity modulated high energy neutrons;

FIG. 3 is a representation of one cycle of neutron generation which is plotted in terms of intensity as a function of time;

FIG. 4 is a representation of one cycle of thermal neutron response which is plotted in terms of intensity as a function of time and is time related to the curve shown in FIG. 3;

FIG. 7 is a time related representation of electrical signals relative to the fast neutron and thermal neutron clouds.

DESCRIPTION OF THE PREFERRED EMBODIMENT

Figure 5:
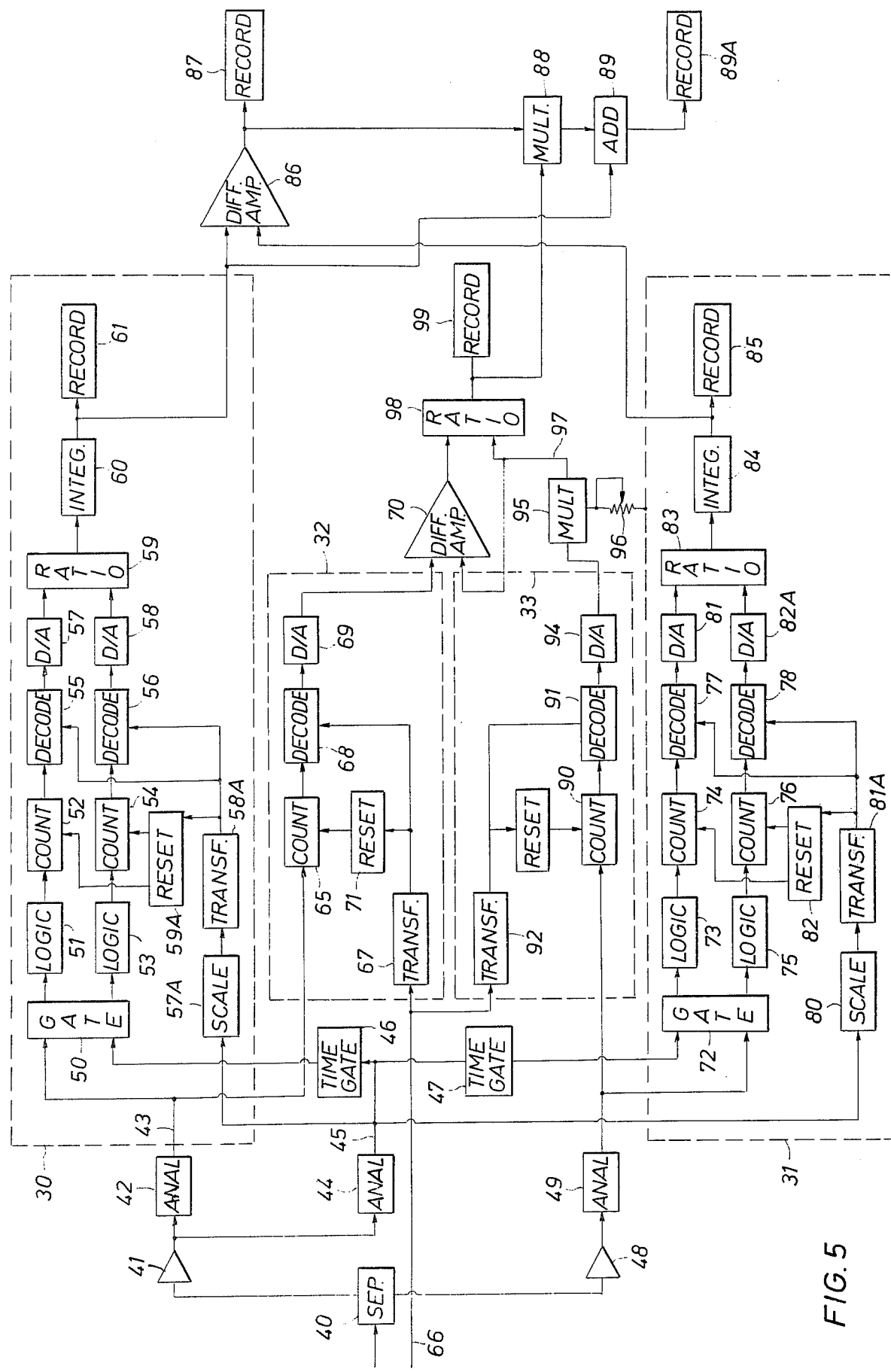
FIG. 5 is a schematic representation of surface equipment for the processing of downhole derived signals in accordance with the invention.

Referring now to FIG. 1, a well bore 10 traverses earth formations 11, and may be lined with a tubular casing which is cemented in place. A logging instrument or sonde 12 can be suspended in the well bore 10 by means of an armored electrical cable 13 which is spooled on surface located winch or reel 14. An electrical or mechanical mechanism of conventional design as known in the art, and schematically illustrated by dashed line 16, transmits depth data from a sheave wheel 16A to the truck 15 as a function of the depth of the tool 12 in the well bore. Hence, measurements made by the logging tool 12 can be transmitted via the cable 13 to the truck 15 and recorded in the truck 15 by a conventional well logging recorder (not shown) as a function of depth.

The logging tool 12 for use with the present invention typically includes a nose piece or bull plug 12A at its lower end, a neutron generating source 12B, a radiation shielding section 12C, a thermal neutron detector 12D, a gamma ray detector 12E and an electronics section 12F. The neutron detector 12D can be a $He^3$ or $BF_3$ (Boron trifluoride) device. The gamma detector 12E can be a $NaI^{(te)}$ crystal optically coupled to a photomultiplier tube. In the electronics sections 12F are power supplies, a sync pulse generator and signal level detectors for producing electrical signals representative of gamma ray and thermal neutron count signals from detectors 12D and 12E.

The power for the downhole unit is supplied via conductors in the armored cable 13 from surface power supplies (not shown) in truck 15. The armored cable can be conventional multiconductor well logging cable or can comprise armored coaxial cable, if desired. In the present invention, thermal neutrons detected by detector 12D are presented to cable 13 conductors for transmission to the surface as negative sharp peaked voltage pulses generated in the electronic sections 12F. Gamma rays dectected by detector 12E are presented to cable 13 conductors for transmission to the surface as positive sharp peaked voltage pulses generated in the electronic section 12F. A larger amplitude, positive, sharp peaked pulse is also transmitted as a sync pulse from the electronics section 12F once for each full cycle of harmonic intensity modulation of source 12B.

The neutron source 12B is preferably of the deuterium-tritium accelerator type. This type of neutron source accelerates deuterium ions onto a target material which is impregnated with tritium. The deuterium ions are furnished by a replenisher which usually comprises a material impregnated with deuterium which is boiled off by heating. The deuterium atoms thus provided are then supplied to an ion source comprising a region of the tube in which electric fields are provided to ionize the deuterium from the replenisher and to focus the positive ions into a beam suitable for acceleration onto the target material, which is kept at a high negative potential. The ion source is provided with an electrode structure analagous to that of a conventional triode vacuum tube and having an element analogous to the control grid of such tube. By applying a time varying voltage to this "control grid" element, the resultant neutron output of the accelerator tube may be modulated for providing a harmonically alternating intensity neutron output.

Alternatively, if it is desired to use a mechanical source rather than a Deuterium-Tritium accelerator, such a source is depicted in FIG. 2. A cylindrical core 20 of Beryllium is mounted for rotation about its central axis 21 and driven by a motor 22 at a constant angular speed. Attached to the outer surface of the Beryllium core are two lengthwise extending segments 23 of nickel, each segment 23 being defined within 90°, lengthwise extending quadrants which are diameterically disposed relative to one another. Concentrically disposed about the axis 21 is a tubular outer housing 23 which is stationary relative to the core 20. Diametrically disposed on the inner wall of the housing 23 are longitudinally extending segments 25 of Plutonium 238 or Actinium 227. The segments 25 are defined by 90° lengthwise extending quadrants which are diameterically disposed relative to one another. The shape of segments 25 and 23 are such that as they are moved at constant speed past each other, a smooth harmonic function of alpha particles emitted by the radioactive element is allowed to reach the Beryllium. With this system, rotation of the core 20 produces an intensity varying (as a function of time) neutron cloud which is harmonically modulated in intensity.

For a clearer understanding of the present invention, it will be helpful to consider first an explanation of its underlying principles. In this explanation certain simplifying assumptions are made for ease of analysis. For example, it is assumed that a spacially distributed source of thermal neutrons (or a thermal neutron cloud) is created in the earth formations by the action of the high energy neutron source. Also, the slowing down time $\tau_s$ for the fast neutrons produced by the source is assumed to be considerably shorter than the thermal neutron decay time $\tau$ (previously defined). This assumption is valid, for example, in high porosity, fluid saturated sands.

The following differential equation for the time rate of change of the thermal neutron population N within the earth formations can be shown from elementary principles:

$$\frac{dN}{dt} = \lambda \cdot N + \lambda_s [N_o + \delta N_o e^{iWt}] \quad (3)$$

where $N_o$ = the average number of fast neutrons generated $\delta N_o e^{iwt}$ = the number of fast neutron varying harmonically with $t$ at a frequency $w$.
$N$ = thermal neutron population density
$\lambda = 1/\tau$ where $\tau$ is the thermal neutron decay time
$\lambda_s = 1/\tau_s$, where $\tau_s$ is the slowing down time for a neutron $$\omega = 2\pi\nu = \frac{2\pi}{T}$$

where $\nu$ is the frequency of fast neutron source intensity modulation, and $T$ is its time period.

The solution of equation 3 for the thermal neutron population density as a function of time N(t) may be shown to be:

$$N(t) = \frac{\lambda_s}{\lambda} \left[ N_o + \frac{\delta N_o}{\sqrt{1 + \left(\frac{W}{\lambda}\right)^2}} \cdot e^{i(WT + \delta)} \right] \quad (4)$$

where $\phi$ represents the value of a phase angle of the intensity of formation thermal neutrons with respect to the intensity of the neutron source. This phase angle may be thought of as a time lag in the creation of the thermal neutron population from the fast neutron population which is a function of the formation properties with respect to thermal neutron.

The phase angle $\phi$ by which the thermal neutron population density N(t) lags behind the intensity of the source is given by the expression:

$$\phi = \arctan\left(-\frac{W}{\lambda}\right) = \arctan(-W \cdot \tau) = \arctan\left(-2\pi \frac{\tau}{T}\right) \quad (5)$$

Equation (5) can be used to derive a measurement of the thermal neutron decay time $\tau$ of the traversed earth formation by measuring the phase angle $\phi$. The determination of the thermal neutron decay time $\tau$ by a phase angle measurement is preferred in the present invention for the reason that background radiation affects are automatically taken into account as will be shown later.

Values for the phase angle $\phi$ which would be expected for various exciting source frequencies and thermal neutron decay times commonly encountered in thermal neutron decay time or neutron lifetime logging are shown in Table 1. From this table can be seen that the lower operating frequencies result in a wider dynamic range for the phase angle measurements.

TABLE I

| $\tau$ Decay Times $\mu$ sec. | Phase Angle $\phi$ at Source Modulation Frequencies of | | |
|---|---|---|---|
| | 100 H$_z$ $\phi$ | 200 H$_z$ $\phi$ | 1000 H$_z$ $\phi$ |
| 50 | 1°48' | 3°36' | 17°26' |
| 100 | 3°36' | 7°9' | 32°8' |
| 200 | 7°9' | 14°6' | 51°34' |
| 400 | 14°6' | 26°40' | 68°17' |

As a practical compromise between dynamic range and magnitude of the phase shift effect, a modulation frequency of about 400 $H_z$ is preferably used in the practice of the present invention. However, it will be appreciated by those skilled in the art, that other modulation frequencies or wave forms other than pure sinusoids could be used with similar facility and could indeed prove preferable under some conditions.

In the actual well logging geometries, the influence of the borehole environment also must be taken into account. The phase angle $\phi$ actually measured by the logging instrument is that of a superposition of borehole and formation components, i.e., $$R \cdot e^{i\phi} = R_B e^{i\phi_B} + R_F e^{i\phi_F} \quad (6)$$

where
- $R$ is the composite amplitude of intensity of thermal neutrons measurement at a phase angle $\phi$ with respect to the source
- $R_B$ is the amplitude of the borehole component of thermal neutron intensity
- $R_F$ is the amplitude of the formation component of thermal neutron intensity
- $\phi_B$ is the phase angle attributable to the borehole component
- $\phi_F$ is the phase angle attributable to the formation component.

The tangent of the phase angle $\phi$ in terms of the resultant borehole and formation components may be written as follows:

$$\tan\phi = \frac{(R_B \sin\phi_B + B_F \sin\phi_F)}{(R_B \cos\phi_B + R_F \cos\phi_F)} \quad (7)$$

or $$\tan\phi = \frac{\left[\tan\phi_F + \frac{R_B}{R_F}\tan\phi_B \cdot \left(\frac{\cos\phi_B}{\cos\phi_F}\right)\right]}{\left[1 + \frac{R_B}{R_F} \cdot \left(\frac{\cos\phi_B}{\cos\phi_F}\right)\right]}$$

For most of the angles encountered and frequencies below a 500 $H_z$ and $R_B/R_F$ as listed in Table II, the ratio $\cos\phi_B/\cos\phi_F$ can be set equal to one (1) without making an error or more than a few percent. Therefore, equation 7 can be approximated by the following relationship:

$$\tan \phi \approx (X \cdot \tan\phi_B + \tan\phi_F/(1 + X. \quad (8)$$

or $$\tan\phi_F \approx \tan\phi + X \cdot (\tan\phi - \tan\phi_B)$$

where
$X = R_B/R_F$.
For $\tan \phi$ to approach $\tan\phi_f$, the ratio $$X = \frac{\text{Magnitude of Borehole Component}}{\text{Magnitude of Formation Component}} = \frac{R_B}{R_F}$$

should be small compared to $\tan\phi$.

The thermal neutron decay time of the borehole component has been measured in a typical Gulf Coast well to average about 35 $\mu$sec resulting in a small $\tan\phi_b$. To eliminate errors introduced by the borehole component, the ratio value $x = r_b/r_f$ should be measured simultaneously with $\tan\phi$ since the $X$ value is porosity dependent. The ratio $x = r_b/r_f$ can be made smaller by increasing source to detector spacing as shown in Table II for PuBe neutrons and a 2 inch $\times$ 4 inch Nai(Tl) detector in fresh water limestones and a cased fresh water-filled borehole.

TABLE II

| Porosity $\phi$ % | Spacing = | 15.75" | 22.5" | 27" | 35.6" |
|---|---|---|---|---|---|
| | | | $X = R_B/R_F$ | | |
| 13.4 | | 1.8 | 0.82 | 0.61 | 0.362 |
| 25.5 | | 1.3 | 0.47 | 0.28 | |

The improvement in measuring the correct formation phase angle withi spacing and reduction of X is shown in Table III for the 25.5% porosity lime formation of Table II.

TABLE III

| $\gamma = 100$ Hz ; $\omega_B = 1°15'$ ; $\phi_F = 14°28'$ ; ($\tau = 4411$ $\mu$ sec.) | | | |
|---|---|---|---|
| Spacing | 15.75" | 22.5" | 27" |
| $\phi$ Meausred | 7°4' | 10°2' | 11°38' |
| % Deviation from $\phi_F$ | −51% | −30.6% | −19.3% |

From detailed studies of a chlorine well logging system using a Nai(Tl) gamma detector, it has been found that the gamma component contributed by the borehole environment to the total detector response is directly proportional to the thermal neutron flux within the borehole. The thermal neutron flux in the borehole is determined from a separate thermal neutron measurement with a thermal neutron detector, such as a $He^3$ or $BF_3$ counter. By using an appropriate calibration, the borehole component $r_b$ included in the gamma detector response can be subtracted using the thermal neutron measurement leaving only the formation component $r_f$. The borehole component phase angle $\phi_b$ is also obtainable from the borehole component measurement. Having so determined $r_b$, $r_f$, and $\phi_b$, the true formation phase angle $\phi_f$ can be obtained from the composite phase angle $\phi$, which is the composite of the phase lags of borehole and formation components. The value for $\tan\phi_f$ can be obtained from equations 7 and 8. With the value for $\tan\phi_f$, then the formation thermal neutron decay time is then obtainable from equation 5.

The thermal neutron macroscopic capture cross-section $\Sigma$ is a function of the thermal neutron decay time $\tau$ and is sometimes defined as $$\Sigma = \frac{4545}{\tau} \quad (9)$$

where $\tau$ is in microseconds and $\Sigma$ is in $cm^2/cm^3$.

The thermal neutron decay time of the borehole component is generally small and practically constant throughout a well due to uniformity of the borehole fluid. This quantity is often also much the same from well to well in a given geographical area. In such instances, it may not be necessary to measure $\tan\phi_b$ and a representative value for a particular geographical area can be established as a tool calibration constant.

The tangents of the phase angles $\phi$ and $\phi_b$ are measured by counting of the gamma rays representative of thermal neutron captures and thermal neutrons representative of the thermal neutron flux in the borehole, respectively, during successive quadrants of the neutron source modulation period. Referring to FIG. 3, one complete period of the neutron source intensity modulation cycle is illustrated as curve N. A detector response curve D is also illustrated in FIG. 4. The time $t_o$ is the "zero" crossing point where the instantaneous neutron intensity starts to exceed the average neutron output of the generator. During the time interval $t_o - t_1$ (which is one-quarter of the modulation period of the neutron source), the counts $C_1$ from the detector are accumulated in a counter. For each successive quadrant time interval $t_1 - t_2$, $t_2 - t_3$, and $t_3 - t_4$, the corresponding counts $C_2$, $C_3$ and $C_4$ are accumulated in other counters. The phase shift of the detector response curve D with respect to the curve N is a function of time and phase angle $\phi$ where $$\Delta t = \frac{\phi}{2\pi/T} \qquad (10)$$

The tangent value of the phase shift of the detector response curve D with respect to the generator output curve N is given by the expression $$TAN\phi = \frac{(C_1 + C_4) - (C_2 + C_3)}{(C_1 + C_2) - (C_3 + C_4)} \qquad (11)$$

From equation 11 it is evident that any background due to natural radioactivity with a half life considerably longer than the neutron source modulation period is automatically cancelled out in the measurement. This is due to the fact that the background may be thought of (since it has such a longer period than the modulation) as being essentially constant in each time quadrant of the modulation cycle.

Referring now to FIG. 5, a data processing system is shown for determining from the composite phase angle $\phi$ and the borehole component phase angle $\phi_b$, the ratio of borehole component to composite $r_b/r_f$, the thermal neutron decay time $\tau$ or macroscopic capture cross-section $\Sigma$. This system is located in the logging truck 15 of FIG. 1. The total formation component $(r_f + r_b)$, the borehole component $r_b$ and the ratio of $r_b/r_f$ are also determined. The thermal neutron decay time $\tau$ for the composite of the surrounding media is determined in a first processng channel 30. The decay time $\tau_b$ for the borehole component is determined in a second processing channel 31. The magnitude of the total formation component $(r_f + r_b)$ is determined in a third channel 32. The magnitude of the borehole component $r_b$ is determined in a fourth channel 33.

As shown in FIG. 5, voltage signals including the large positive value sync pulses from 12F of FIG. 1, positive voltage pulses representative of gamma ray measurements from detector 12E of FIG. 1, and negative pulses representative of thermal neutron measurements from detector 12D of FIG. 1 are supplied to pulse separator means 40 where the large amplitude positive sync pulses and smaller amplitude, positive, gamma ray detector pulses are separated from the thermal neutron detector pulses on the basis of their polarity by the use of diode logic. The sync and gamma ray data pulses are supplied to a pulse amplifier 41 for amplification single channel pulse height analyser means 42 are coupled to the output of amplifier 41 and selectively separates the gamma ray pulses on the basis of amplitude. The output of analyzer 42 is supplied via conductor 43 to the channels 30 and 32 for further computations using this value. For timing purposes, another single channel pulse height analyser 44 is also coupled to the amplifier 41 and selectively separates on the basis of their amplitude the sync pulses which are then supplied to an output conductor 45. The sync pulse outputs on conductor 45 are used to synchronize time gate means 46 and 47 to provide output signals used to condition data gates at suitable time intervals with respect to the modulation period. One sync pulse is generated for each cycle of modulation period of the neutron generator 12B of FIG. 1 as previously discussed.

The gamma ray data pulse outputs from the analyser 42 are supplied via the conductor 43 to multiple input AND gate 50. The time gate means 46 operates to condition the AND gate 50 to sequentially output gamma ray pulses during four equal time quadrants which are defined between times $T_o - t_1$, $t_1 - t_2$, $t_2 - t_3$, and $t_3 - t_4$ (see FIG. 4). The magnitude of the counts occuring during this time are referred to as $C_1$, $C_2$, $C_3$ and $C_4$. For one cycle of neutron generator modulation the time intervals are represntative of successive 90° periods (or quadrants) of the cycle. Thus, in the first channel 30, the detected gamma counts are separated into four equal time quadrants and synced to the modulated neutron generation from a time $t_o$.

The AND circuits 50 are arranged to supply the pulse counts $C_1$ and $C_4$ to an up-down count logic circuit 51 which supplies the pulses to either the up count or down count input terminal of a counter 52. The pulse counts $C_1$ and $C_4$ are supplied to the Up count input terminal of counter 52 and thereby algebraically summed. The logic circuit 51 supplies pulse counts $C_2$ and $c_3$ to down count input terminal of counter 52 and thus counts $C_2$ and $C_3$ are algebraically subtracted from the pulse count $C_1 + C_4$. Thus the counter 51 during one cycle of operation (corresponding to one modulation period) algebraically adds the pulse counts $C_1$ and $C_4$ and subtracts the pulse counts $C_2$ and $C_3$ thereby forming the numerator of the fraction on the right in equation 10.

Similarly the AND circuit 50 is conditioned by time gate 46 and an up-down count logic circuit 53 to supply the pulses $C_1$ and $C_2$ to the up count input terminal of a counter 54 which sums up the data pulses $C_1$ and $C_2$. The up-down count logic circuit 53 also supplies the pulses $C_3$ and $C_4$ to the down count input terminal of counter 54 and the pulse counts $C_3$ and $C_4$ are thereby algebraically subtracted from the pulse count $C_1$ and $C_2$. The resultant is to accumulate the denominator of the fraction of equation 10 in counter 54. The counters 52 and 54 respectively have associated decoder circuits 55 and 56 which read out the numbers stored in the counters upon receipt of a transfer signal. To obtain a transfer signal the output line 45 of the sync analyser 44 is connected to a scaler circuit 57 which can count sync pulses. Upon receipt of a preselected number of cycles, the scaler circuit 57 operates a transfer one-shot multivibrator 58 to provide a transfer signal to each of the decoders 55 and 56. At the same time, the transfer one-shot 58 actuates a reset circuit 59 to reset the counters 55 and 56. Each of the decoder circuits 55 and 56 is connected to a digital to analog circuit 57 and 58 to convert the digital number to an analog signal. The analog circuits 57 and 58 output to a ratio circuit 59 which divides the values derived from the counters. The ratio circuit output is then in terms of the value for the tangent of the phase angle for the total component of the surrounding borehole and earth formations. As discussed before, the tangent of the phase shift angle is given by the expression $$\text{TAN}\phi = \frac{(C_1 + C_4) - (C_2 + C_3)}{(C_1 + C_2) - (C_3 + C_4)} \qquad (12)$$

An integrator and time constant circuit means 60 receives the analog output and provides an output signal to an analog recorder 61. The recorder 61 can record the tangent of the phase angle directly or by conversion, the decay time $\tau$ or capture cross-section $\Sigma$ value.

The output signals from the analyzer 42 are also supplied via the conductor 43 to a circuit 65 in the channel 32 which accumulates a total of pulses counts $C_1$ through $C_4$ from the formation and the borehole. At one second intervals, a timing sync pulse is generated on conductor 66 to actuate a transfer circuit means 67 which operates a decode circuit 68. The decode circuit 68 reads out the counter numbers in counter 65 at the time the transfer pulse occurs. The output of the decode circuit 68 is supplied to a digital to analog 69 which outputs an analog signal as a function of the gamma counts to a differential amplifier 70. At the time the transfer pulse from the transfer circuit 67 is generated, a reset circuit 71 is actuated to reset the counter 65. The output of a d/a converter 69 is representative of the total magnitude of the formation and borehole components $(r_f + r_b)$.

The thermal neutron pulses are supplied by the separator means 40 to a pulse amplifier 48 which feeds the pulses to an analyser 49. The output of the analyzer 49 is supplied to multiple input AND gate circuits 72. The time gate means 47 operates to condition the AND gate circuits 72 to sequentially output the thermal neutron pulses quantities $C_1$, $C_2$, $C_3$ and $C_4$ in four equal time quadrants in the same manner as discussed heretofore.

The AND circuits 72 are arranged to supply the pulses detected during the time periods $C_1$ and $C_4$ to an up-down count logic circuit 73 which supplies the pulses to the up count input terminal of counter 74. The counter 74 sums up the data pulses $C_1$ and $C_4$. The AND circuits 72 also supply the pulses $C_2$ and $C_3$ to the up-down count logic circuit 73 which supplies the pulses to the down-count input terminal of counter 74. The pulses $C_2$ and $C_3$ are algebraically subtracted in the counter 74, from the pulse count $C_1$ and $C_4$.

The AND circuits 72 are also arranged to supply the pulses $C_1$ and $C_2$ to an up-down count logic circut 75 which supplies the pulses to either the up or down count input terminals of the up-down counter 76. The counter 76 sums up the data pulses $C_1$ and $C_2$ which are supplied to its up count input terminals. The logic circuit 75 supplies the pulses $C_3$ and $C_4$ to the down count input terminals of up-down counter 76 and the pulses $C_3$ and $C_4$ are algebraically subtracted from the pulse count $C_1$ and $C_2$. The counters 74 and 76 respectively have associated decoder circuits 77 and 78 which read out the numbers stored in the counters upon receipt of a transfer signal. To obtain a transfer signal, the output line 45 of the analyser 44 is connected to a scaler circuit 80 which can count sync pulses and upon receipt of a preselected number of cycles operate a transfer one-shot multivibrator 81 to provide a transfer signal to each of the decoders 77 and 78. At the same time the transfer one-shot 81 actuates a reset circuit 82 to reset the counters 74 and 76. Each of the decoder circuit 77 and 78 is connected to a digital to analog circuit 81 and 82 convert the digital number to an analog signal. The analog circuits 81 and 82 output to a ratio circuit 83 which divides the values derived from the counters. The ratio circuit output is then in terms of the value for the tangent $\tan\phi_b$ of the phase angle for the component of the surrounding borehole according to equation 10. An integrator and time constant circuit means 84 receives the analog output and provides an output signal to an analog recorder 85.

The output signals from the analyzer 49 are also supplied via the conductor 90 to a channel 33 having a counter circuit 91 which accumulates the total of counts from the thermal neutron detector. At 1 second intervals, a sync pulse is generated on conductor 66 to actuate a transfer circuit means 92 which operates the decode circuit 91. The decode circuit 91 reads out the number value in the counter 90 at the time of the transfer pulse. The output of the decode circuit 91 is supplied to a digital to analog circuit 94 which outputs an analog signal as a function of the thermal neutron counts to an analog multiplier 95. The multiplier has adjustment circuit 96 which provides a multiplying function. The output from the multipler 95 is supplied via a conductor 97 to the differential amplifier 70 and to an analog ratio circuit 98. The differential amplifier 70 combines the functions of $r_b + r_f$ from the d/a converter 69 and $r_b$ from the multiplier 95 and outputs and $r_f$ function. The ratio circuit 98 obtains the ratio of $r_b/r_f$ and outputs this value to a recorder 99.

The output from the integrator circuit 60 is representative of the value for $\tan\phi$ while the output from the integrator 84 is representative of the value for $\tan\phi_b$. These two outputs are combined in a differential amplifier 86 to develope an output representative of the difference of the values for $\tan\phi - \tan\phi_b$ and the difference value is recorded by a recorder 87.

The value for the $\tan\phi_f$ where $$\text{TAN}\phi_F = \text{TAN}\phi + \frac{R_B}{R_F}(\text{TAN}\phi - \text{TAN}\phi_B) \qquad (13)$$

is determined by combining the $r_b/r_f$ signal from the ratio circuit 98 with the $(\tan\phi - \tan\phi_b)$ value from the amplifier 86 in a multiplier 88. The output of the multiplier circuit 88 is added with the output of the integrator circuit 60 in an adder circuit 89. The output $\tan\phi_f$ of the adder is recorded in a recorder 89A.

Figure 6:
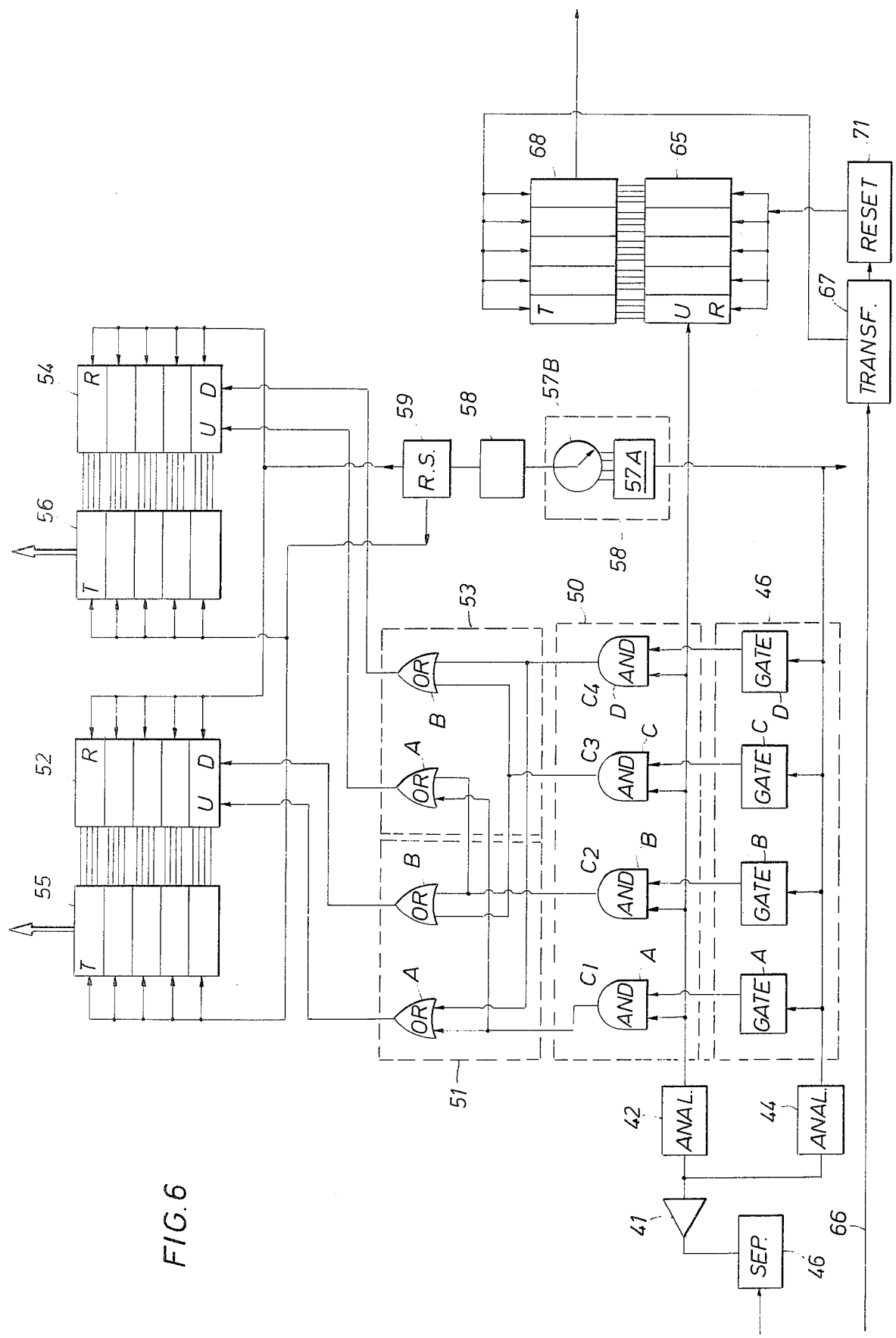
FIG. 6 is a schematic representation in greater detail of the apparatus illustrated in FIG. 5.

In FIG. 6, further detail is illustrated of the time gate 46, the AND gate 50, the logic circuits 51 and 53 and the counter and decode circuits. From this partial illustration, the arrangement of similar circuits in similar types of channels will be readily apparent. A sync signal 100 (see FIG. 7) is supplied to each of four time gates 46(A–D) which sequentially provide a gating pulse 101–104 for each 90° of the neutron generator modulation period (curve N). The gating pulses are supplied to AND circuits 50(A–D). The occurrence of gating pulses 101–104 sequentially renders the AND circuits 50(A–D) operative to transmit the counts occuring during the timing interval to the logic circuits 51 and 53. The logic circuits 51 and 53 are OR circuits. An OR circuit 51A is coupled to the count-up input of a decode counter 52 while an OR circuit 51B is coupled to the count-down input of the counter 52. The count-up input of counter 54 is connected to an OR circuit 53A while the count-down input is connected to the OR circuit 53B. The AND circuit 50A is connected to the inputs of the OR circuits 51A and 53A. The AND circuit 50B is connected to the inputs of the OR circuits 51B and 53A. The AND circuit 50C is connected to the OR circuits 51B and 53B. The AND circuit 50D is connected to the OR circuits 51A and 53B. Thus, OR circuit 51A supplies add counts $C_1$ and $C_4$ to counter 52; OR circuit 51B supplies subtract counts $C_2$ or $C_3$ to counter 52; OR circuit 53A supplies add counts $C_1$ or $C_3$ to counter 54; and OR circuit 53B supplies subtract counts $C_3$ or $C_4$ to counter 54.

The decode counters 52 and 54 are respectively connected to quad latch and decoder circuits 55 and 56. The count in a counter is read out by decoders 55 and 56 when they receive a transfer pulse and the counters are reset by reset pulses. The transfer pulses are generated in relation to sync pulses. Sync pulses from the analyser 44 are supplied to a scaling circuit 57A which counts sync pulses. A scaling switch 57B determines the number of cycles or sync pulses desired before a transfer pulse. The switch 57B couples to a one-shot multivibrator which generates a transfer pulse for each of the decoder circuits 55 and 56 and triggers a reset circuit 59 which applies a reset pulse to the counters 52 and 54.

In the operation of the foregoing described system, a logging tool 12 is moved through a well bore (which is typically cased) by means of an armored logging cable 13. In the truck 15, a recorder which can use a tape or analog recording medium, for example, is driven by the cable movement to provide a record as a function of time. In the logging tool, a source 12B of high energy neutrons is intensity modulated to provide a harmonically modulated source of neutrons to the surrounding media.

The tool includes a thermal neutron detector 12D and an adjacently located gamma ray detector 12E. The gamma ray detector 12E responds to the thermal neutron capture gamma rays from the surrounding media and includes a component attributable to the borehole and a component attributable to the earth formations. The thermal neutron detector 12D responds to the thermal neutron flux in the borehole.

For each cycle of neutron generation a sync timing pulse is generated. The thermal neutron detector produces negative electrical pulses as a function of the neutron count, while the gamma ray detector produces positive electrical pulses as a function of thermal neutron capture in the surrounding media. These electrical signals are transmitted to the truck recording unit 15.

At the truck recording unit 15 the electrical pulses are separated with the thermal neutron signals being applied to one computing channel and the gamma ray signals being applied to another computing channel. Mathematically the tangent value for an angle can be determined by algebraic computation of the counting values where $$\text{TAN}\phi = \frac{(C_1 + C_4) - (C_2 + C_3)}{(C_1 + C_2) - (C_3 + C_4)} \quad (14)$$

and $C_i$ are the counts accumulated during the ith quadrant of the source modulation period. The tangent angle is related to the phase shift (or timelag) of the thermal neutron density relative to the initiating neutron source density and from the tangent angle the decay time or capture cross-section are determinable.

Each computing channel is timed by the sync pulse and performs the computing function for tan$\phi$ over a desired time interval of multiples of the source period.

At the same time the thermal neutron signals and gamma ray signals are respectively counted for each 1 second time period and output to a ratio circuit 98 so that the ratio of the borehole component $r_b$ to the formation component $r_f$ can be established. The phase angles and the ratio of the borehole and formation component are combined to derive the formation phase angle and the decay time or capture cross-section are recorded.

If desired, the borehole component $r_b$ can be assumed to be a constant and input as such into the foregoing systems in an obvious manner.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. A method for determining parameters of interest in a borehole traversing earth formations by means of thermal neutron characteristics generated in a borehole and comprising the steps of continuously generating high energy neutrons in a well bore and bombarding the surrounding media with such neutrons, modulating the intensity of said high energy neutrons harmonically as a function of time for developing an intensity modulated cloud of thermal neutrons as a function of time in said surrounding media, and measuring a thermal neutron characteristic of said intensity modulated cloud of thermal neutrons for determining a parameter of interest relative to said surrounding media.

2. The method as defined in claim 1 and including the step of performing said measuring step along said borehole as a function of depth and recording said measurements along said borehole as a function of depth.

3. The method as defined in claim 2 wherein said measuring step includes measuring the phase of said thermal neutron cloud relative to said high energy neutrons.

4. The method as defined in claim 3 including the steps of measuring said thermal neutron characteristic as a function of time, separating said thermal neutron charateristic into four equal time quadrants for each repetitive cycle of said harmonically modulated high energy neutrons, and combining said measured thermal neutron characteristics for deriving the tangent of the phase angle between said high energy neutrons and said thermal neutrons.

5. The method as defined in claim 4 and including the steps of separately detecting the thermal neutron characteristics in the borehole and the thermal neutrons characteristics in the surrounging media and separating each of said thermal neutron characteristics into four equal quadrants for each repetitive cycle of said harmonically modulated high energy neutrons.

6. The method as defined in claim 4 and further including the step of converting said phase angle into a thermal decay time value and recording said thermal decay time value as a function of depth.

7. The method as defined in claim 4 and further including the step of converting said phase angle into a thermal neutron macroscopic capture cross-section value and recording said capture cross-section value as a function of depth.

8. A method for logging earth formations traversed by a well bore and for obtaining a record of earth formation parameters as a function of depth comprising the steps of moving a logging tool relative to earth formations traversed by a well bore for obtaining measurements of borehole parameters as a function of the depth of a well bore, continuously generating high energy neutrons in such tool and bombarding the surrounding media with such neutrons for developing thermal neutrons in such surrounding media, modulating the intensity of said high energy neutrons harmonically, continuously detecting the thermal neutron response from said surrounding media, and developing electrical signals as a function of the thermal neutron response from said surrounding media.

9. The method according to claim 8 and further including the step of developing synchronizing electrical signals for each cycle of said modulated high energy neutrons, and the step of combining said synchronizing signals and said thermal neutron signals for determining the time lag relationship between said signals.

10. The method according to claim 9 and further including the step of separating said thermal neutron signals into four time quadrants for each cycle of said high energy neutrons and converting said four time quadrant signals into a phase angle measurement of said thermal neutron signals relative to said high energy neutrons.

11. The method according to claim 10 and further including the step of deriving from said phase angle measurement, an electrical signal representative of thermal decay time.

12. The method as defined in claim 8 and including in said continuously detecting step, the steps of detecting separatly the borehole thermal neutron component and the thermal neutron component in the surrounding media, and including in said step of developing electrical signals, the steps of developing first and second electrical signals respectively as a function of the phase differences between such detected thermal neutrons relative to such modulated high energy neutrons.

13. The method as defined in claim 12 and further including the step of subtracting the borehole thermal neutron component from the thermal neutron component for the surrounding media for deriving the thermal neutron component due to the formation materials in the surrounding media.

14. The method as defined in claim 13 and further including the step of converting such formation thermal neutron component to a representation of decay time for such formation materials.

15. The method as defined in claim 13 and further including the step of converting such formation thermal neutron component to a representation of formation capture cross-sectional values for such formation materials.

16. A method for logging earth formations traversed by a well bore and for obtaining a record of earth formation parameters as a function of depth comprising the steps of moving a logging tool relative to earth formations traversed by a well bore for obtaining measurements of borehole parameters as a function of the depth of a well bore, continuously generating high energy neutrons in such tool and bombarding the surrounding media with such neutrons for developing thermal neutrons in such surrounding media, modulating the intensity of said high energy neutrons and developing an electrical sync pulse for each frequency cycle, continuously detecting such thermal neutrons from such surrounding media and developing first electrical signals representative of the thermal neutron count as a function of time, for each cycle of said high energy neutron modulation, separating said first electrical signals for providing four time quadrants quantities of signals for four equal time periods of each frequency cycle, combining said time quantities for deriving a representation of the phase angle difference between said detected thermal neutron and said high energy neutrons, deriving a decay time function of such thermal neutrons in surrounding media from said representation of said phase angle difference, and recording such decay time function as a function of depth of a well bore.

17. Apparatus for determining parameters of interest in a borehole traversing earth formations by means of thermal neutron characteristics generated in a borehole and comprising a logging tool having means for continuously generating high energy neutrons in a wellbore and bombarding the surrounding media with such neutrons, and means for modulating the intensity of said high energy neutrons harmonically as a function of time for developing an intensity modulated cloud of thermal neutrons as a function of time in said surrounding media.

18. The apparatus as defined in claim 17 and including means for detecting thermal neutron characteristics of said intensity modulated cloud of thermal neutrons.

19. The apparatus as defined in claim 18 and including means for determining the phase or time lag of said thermal neutron characteristics relative to said high energy neutrons.

20. The apparatus as defined in claim 19 where said determining means includes means for separating said thermal neutron characteristics into four quadrants for each cycle of said high energy neutrons and means for computing the tangent value of the phase from said characteristics for each of such quadrants.

21. The apparatus as defined in claim 20 and further including means for recording said tangent values as a function of depth.

22. The apparatus as defined in claim 21 and further including means for converting said tangent values into a decay time value and means for recording said decay time value.

23. Apparatus for use in logging earth formations traversed by a well bore comprising
a logging tool adapted for passage through a well bore,
a source of high energy neutrons in said logging tool for bombarding surrounding media with high energy neutrons,
means for intensity modulating said source of high energy neutrons with a sinusoidal function,
means in said logging tool for formation thermal neutrons resulting from bombardment of the media with high energy neutrons, and
means for determining the phase angle of the detected formation thermal neutrons relative to said modulated high energy neutrons.

24. The apparatus as defined in claim 23 wherein said detecting means includes means for providing electrical signals representative of the thermal neutron count as a function of time and wherein said intensity modulating means provides an electrical sync pulse for each cycle of modulation, said determining means including means for processing said electrical signals, for counting said thermal neutrons in time quadrants for each cycle relative to said sync pulse, and for computing said phase angle from said thermal neutron count.

25. The apparatus as defined in claim 24 wherein said detecting means further includes means for detecting thermal neutrons from the immediate borehole environment and for providing electrical signals representative of the thermal neutrons in the borehole fluid as a function of time.

26. The apparatus as defined in claim 25 where said detecting means includes a second means for processing said electrical signals representative of borehole thermal neutrons, for counting said borehole thermal neutrons in time quadrants for each cycle relative to said sync pulse, and for computing the phase angle from said borehole thermal neutrons.

27. The apparatus as defined in claim 24 and further including means for transporting said logging tool through a well bore, and means for recording said phase angle as a function of depth of the logging tool in a well bore.

28. The apparatus as defined in claim 26 and further including means for transporting said logging tool through a well bore means for subtracting said phase angle for said borehole thermal neutrons from the phase angle for said formation thermal neutrons for defining the phase angle for said formation an electrical signal representative of decay time as a function of depth of the logging tool in a well bore.

29. The apparatus as defined in claim 24 and including means for processing said electrical signals for such thermal neutrons as a function of time to derive a first magnitude value, means for determining a second magnitude value as a function of time and representative of the borehole effects, and means for deriving a ratio related to said first and second magnitudes.

30. Well logging apparatus for use in providing a well log of earth formations traversed by a borehole including
an elongated logging tool including a source of high energy neutrons, a thermal neutron detector spaced from said high energy neutron source so as to respond primarily to thermal neutrons attributable to the borehole, thermal neutron shielding means disposed between said high energy neutron source and said thermal neutron detector, gamma ray detector means disposed adjacent to said thermal neutron detector means for detecting the thermal neutron population in the formations resulting from the slowing down of fast neutrons,
means for receiving the respective thermal neutron count and sync pulse from said high energy source and for separating said thermal neutron counts into separate signals,
first channel means for receiving said thermal neutron counts from said gamma ray detector and responsive to said sync pulses for combining equal time quadrant counts and for deriving a phase function relative to said high energy source,
second channel means for receiving said thermal neutron counts from said thermal neutron detector and responsive to said sync pulses for combining equal time quadrant counts and for deriving a phase function relative to said high energy source, and
means for combining said phase functions for deriving a function related to the earth formations.

31. The apparatus as defined in claim 30 and further including means for determining the ratio of thermal neutron counts.

32. The apparatus as definend in claim 31 and further including means for combining said ratio with said earth formation function for deriving a product function, means for algebraically adding said product function with said earth formation function.

* * * * *